Figure 1:
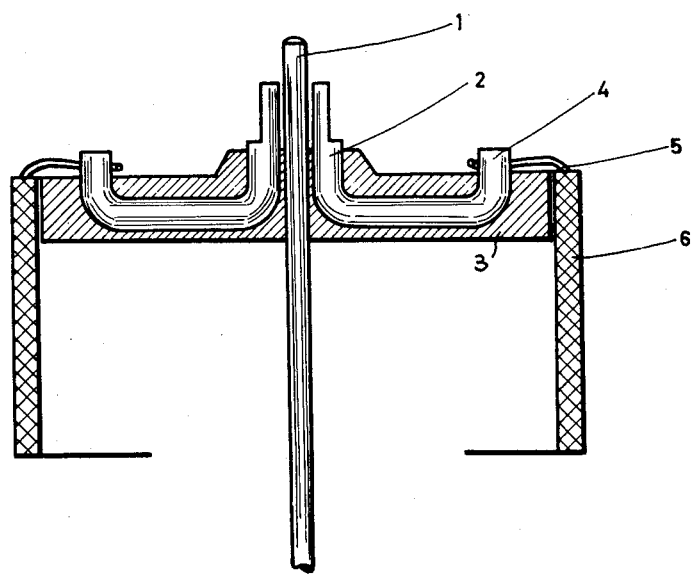

Sept. 12, 1961 F. FAULHABER 2,999,956
COMMUTATOR FOR MINIATURE MOTORS
Filed April 24, 1959

United States Patent Office 2,999,956
Patented Sept. 12, 1961

2,999,956
COMMUTATOR FOR MINIATURE MOTORS
Fritz Faülhaber, Johann-Sebastian-Bach-Weg 9,
Schonaich, Wurttemberg, Germany
Filed Apr. 24, 1959, Ser. No. 808,651
Claims priority, application Germany Apr. 26, 1958
7 Claims. (Cl. 310—235)

My invention relates to a commutator of particularly small diameter for electric miniature motors in which the torque losses due to brush friction must be kept as small as possible.

Some of the miniature motors commercially available possess commutators of a design similar to that of the conventional larger-size motors. Other known motors of miniature size are composed of punched and bent sheet-metal pieces which are held in cheeks of synthetic plastic or are embedded in such plastic by die casting or injection molding. All of these commutators have the disadvantage of being relatively large in diameter, for example several millimeters, so that the resulting brush-friction torque appreciably impairs the efficiency. Furthermore, the soldering of the rotor wires to the commutator segments is made difficult by the slight spacing between the segments, particularly because the dissipation of heat through the material is relatively great.

It is an object of my invention to devise a commutator of smallest possible size, for example below one millimeter, and in which the fastening of the individual segments involves a cheapest possible method, and in which furthermore the soldering of the conductor wires of the rotor winding can be carried out more conveniently. Another object is to provide a commutator which, despite its extremely small size and without foregoing the other advantages above mentioned, can be given a relatively large number of segments.

To achieve these objects, and in accordance with a feature of my invention, the commutator segments of a miniature-size rotor consist of a number of wire pieces made from a suitable conducting metal or alloy such as copper or silver-palladium. These wires, preferably of circular cross section, are bent to U-shape, embedded by die casting or injection molding in synthetic insulating material, and subsequently machined, for example with a diamond tool, at those ends that protrude from the insulating body and are to form the commutator surfaces proper.

More specifically, the individual segments, uniformly distributed about the commutator axis, consist each of a piece of wire having a first portion of its length extend substantially parallel and near to the axis, an adjacent portion extending radially away from the axis, and a third portion substantially parallel to the first portion, the wire being embedded in the insulating body so that only the two ends of the first and second portions remain freely exposed and protrude at the same side out of the body.

These and more specific features of the invention will be apparent from the embodiment described hereinafter with reference to the drawing in which—

Figure 2:
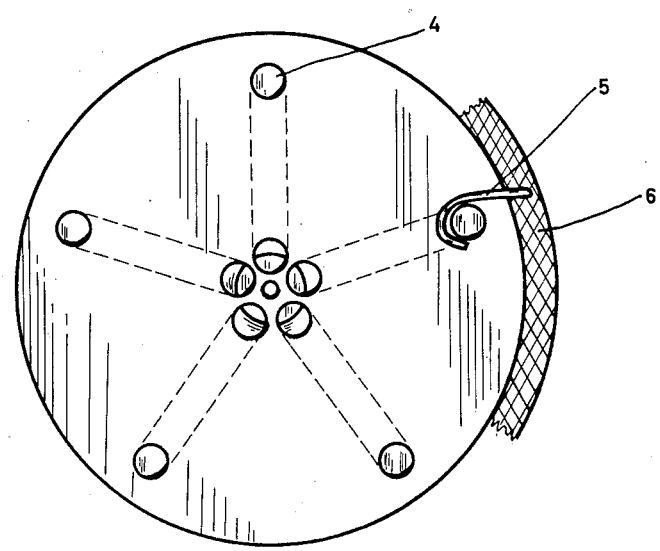

FIG. 1 shows an axial section of a commutator according to the invention and FIG. 2 a corresponding top view, both illustrations being on greatly enlarged scale.

In the following, reference will be made to correlated examples of numerical values, it being understood that these values may be modified as desired. The rotor shaft 1, which carries the commutator, has a diameter of 0.4 mm. and runs in a suitable bearing (not illustrated). The commutator comprises five individual segments 2, each consisting of a piece of wire bent to U-shape. The wire pieces are uniformly distributed about the shaft 1. The inner portion of each wire extends parallel to the shaft axis and is slightly spaced, for example 0.2 mm., from the shaft 1. Each wire has a middle portion which extends from the first portion radially outward and is so embedded in a body 3 of synthetic material that the end 4 of the wire emerges at the outside and is spaced radially from the shaft 1 a much greater extent than the inner portion of the wire. The tap of the rotor winding 6 is soldered to the protruding end 4.

The diameter of the commutator formed by the inner, freely exposed ends of the wires has a diameter of about 1 mm. The inner ends of the wires, forming the commutator surfaces proper, are ground or turned on a lathe by means of a diamond in order to obtain accurately coaxial commutator surface.

The advantages afforded by the invention as embodied in the example described above are as follows:

In the first place, the taps of the rotor winding can be attached to the wire ends 4 by soldering in a very simple manner because the ends 4 have a relatively large radial spacing from the commutator shaft. Furthermore, the manufacture of the commutator is extremely cheap because the commutator segments can readily be embedded in the synthetic insulating materials with the aid of a simple jig. The diameter of the collector can be kept very small and the number of segments can be made relatively great. While five segments are shown on the drawing, a collector of about the same size can readily accommodate seven segments, for example. The machining of the freely protruding wires by means of a diamond on a lathe does not offer any appreciable difficulties, so that a high-quality commutator, suitable for example on rotors serving measuring purposes, can be produced with relatively simple means. The mold for the plastic material used in the manufacture of a commutator according to the invention, can be made particularly simple if, as illustrated on the drawing, the wire pieces of the collector have circular cross section. However, it is also possible to use, instead of round wire, a suitable wire of profiled cross section as may be desired for special purposes.

While the invention has been described with reference to the example of a collector for a miniature motor, it is not limited to such motors but can also be used to advantage for collectors in follow-up control devices and the like apparatus.

This invention is a companion to that described in my application Serial No. 808,784, filed on the same day as the instant application.

I claim:

1. A commutator for a miniature device for interconversion of electrical and mechanical energy, comprising a number of commutator segments distributed about the axial center line of the commutator, each segment being formed of a piece of wire of rounded cross section and having a first portion of its length extending along and near said axial center line and an adjacent portion extending outwardly away from said center line, and a coaxially mounted body of insulating material in which the said adjacent portions are embedded, the respective ends of said first portions freely protruding from the insulating material at the same side and being insulated from each other by intermediate free air spaces, the said ends having outer inset surface portions forming in conjunction with each other a cylindrical coaxial collector surface having a radius less than that corresponding to the diameter of the original rounded wire plus the distance of the wire to said axial center line.

2. In a commutator according to claim 1, said wire pieces having a circular cross section.

3. In a commutator according to claim 1, said wire pieces having a non-circular cross section.

4. A commutator for miniature motors, comprising a commutator shaft, a number of commutator segments distributed about the commutator shaft, each segment being formed of a piece of wire of rounded cross section and having a first portion of its length extending alongside and near said shaft and an adjacent portion extending outwardly away from said shaft, and a coaxially mounted body of insulating material in which the major portion of the lengths of said wires is embedded, the respective ends of said first portions freely protruding from the insulating material at the same side and being insulated from each other and the shaft by intermediate free air spaces, the said ends having outer inset surface portions forming, in conjunction with each other, a cylindrical coaxial collector surface having a radius less than that corresponding to the diameter of the original rounded wire plus the distance of the wire from the axial center line of the shaft.

5. In a miniature motor, a rotor shaft, a commutator comprising a number of commutator segments distributed about said shaft, each segment being formed of a piece of wire of rounded cross section and having a first portion of its length extending along and near the axial center line of said shaft and an adjacent portion extending outwardly away from said center line, and a coaxially mounted body of synthetic insulating material in which the said adjacent portion of the wires is embedded, the respective ends of said first portions freely protruding from the insulating material at the same face of said body and being insulated from each other by intermediate free air spaces, the said ends having outer inset surface portions forming in conjunction a cylindrical coaxial collector surface having a radius less than that corresponding to the diameter of the original rounded wire plus the distance of the wire to said axial center line, the respective outer ends of the wire sections protruding freely from the same face of said body of insulating material, a generally cylindrical rotor armature winding, and electrical connections between said respective outer ends and an immediately adjacent part of the armature winding.

6. In a miniature device for interconversion of electrical and mechanical energy, a rotor shaft, a commutator comprising a number of commutator segments distributed about said shaft, each segment being formed of a piece of wire of rounded cross section and having a first portion of its length extending along and near the axial center line of said shaft and an adjacent portion extending outwardly away from said center line, and a coaxially mounted body of synthetic insulating material in which the said adjacent portion of the wires is embedded, the respective ends of said first portions freely protruding from the insulating material at the same face of said body and being insulated from each other by intermediate free air spaces, the said ends having outer inset surface portions forming in conjunction a cylindrical coaxial collector surface having a radius less than that corresponding to the diameter of the original rounded wire plus the distance of the wire to said axial center line, the respective outer ends of the wire sections protruding freely from the same face of said body of insulating material, a generally cylindrical rotor armature winding, and electrical connections between said respective outer ends and an immediately adjacent part of the armature winding, said body of insulating material comprising a disc, the disc being located with at least a portion of its peripheral edge surface within the cylindrical armature.

7. The apparatus defined in claim 1, the first portions having their lower end portions embedded in the insulating material, so as to provide stronger anchorage thereof to facilitate removal of wire material after the wire is in place, to provide said inset portion.

References Cited in the file of this patent

UNITED STATES PATENTS

| | | |
|---|---|---|
| 702,272 | Windle | June 10, 1902 |
| 1,464,184 | Mansbendel | Aug. 7, 1923 |
| 2,486,875 | Pollock | Nov. 1, 1949 |

FOREIGN PATENTS

| | | |
|---|---|---|
| 575,183 | Great Britain | Feb. 6, 1946 |